May 31, 1927. Re. 16,640

L. D. JONES ET AL

CENTRIFUGAL MACHINE AND PROCESS INVOLVING THE USE OF THE SAME

Original Filed May 1, 1924 4 Sheets-Sheet 1

Inventors
Leo D. Jones
Arthur H. Ayres
By their Attorneys
Kenyon & Kenyon

May 31, 1927. Re. 16,640

L. D. JONES ET AL

CENTRIFUGAL MACHINE AND PROCESS INVOLVING THE USE OF THE SAME

Original Filed May 1, 1924 4 Sheets-Sheet 2

Inventors
Leo. D. Jones
Arthur A. Ayres
By their Attorneys
Kenyon & Kenyon

May 31, 1927. Re. 16,640

L. D. JONES ET AL

CENTRIFUGAL MACHINE AND PROCESS INVOLVING THE USE OF THE SAME

Original Filed May 1, 1924 4 Sheets-Sheet 3

Inventors
Leo D. Jones
Arthur U. Ayres
By their Attorneys
Kenyon & Kenyon

May 31, 1927.

L. D. JONES ET AL

Re. 16,640

CENTRIFUGAL MACHINE AND PROCESS INVOLVING THE USE OF THE SAME

Original Filed May 1, 1924 4 Sheets-Sheet 4

Inventors
Leo. D. Jones
Arthur U. Ayres

By their Attorneys
Kenyon & Kenyon

Reissued May 31, 1927. Re. 16,640

UNITED STATES PATENT OFFICE.

LEO D. JONES AND ARTHUR U. AYRES, OF PHILADELPHIA, PENNSYLVANIA, ASSIGNORS TO THE SHARPLES SPECIALTY COMPANY, OF PHILADELPHIA, PENNSYLVANIA, A CORPORATION OF DELAWARE.

CENTRIFUGAL MACHINE AND PROCESS INVOLVING THE USE OF THE SAME.

Original application filed May 1, 1924, Serial No. 710,388. Original No. 1,575,061, dated March 2, 1926. Divided and this application filed May 29, 1925, Serial No. 33,729. Application for reissue filed April 13, 1927. Serial No. 183,535.

Our invention relates to centrifugal machines and processes involving the use of the same and particularly to such machines and processes wherein certain conditions and effects resulting from the action of centrifugal force or other forces or causes may be promoted or prevented or controlled as may be desired.

When a substance is treated in a centrifugal machine to effect certain desired results, such, for example, as the separation of constituents of the substance from one another, or the alteration of the substance or one of its constituents by the action of the centrifugal force itself or by the effect of some reagent acting simultaneously with the centrifugal force, it is desirable or necessary to prevent the occurrence of undesired changes or conditions of the substance or its constituents or to promote desired changes or conditions thereof. Thus when liquid soap is being clarified by the action of centrifugal force or when such substances as water solutions of licorice are being treated in a centrifugal machine the treatment should be carried out in such a manner as to prevent foaming of the substance. This can be accomplished by maintaining vacuum upon the substance being treated. And in the clarification of drying or oxidizable oil, e. g. whale oil, or of sour oils before neutralization thereof, and in the treatment of transformer oils, particularly where such oil is drawn from the transformer casing and treated and immediately returned to the casing, the best results are secured when oxidation of the substance being treated is prevented. This can be accomplished by maintaining a reduced pressure upon the substance being treated. And in treating materials used in the so-called "dry cleaning" process to purify those materials, in dewaxing oils that have been diluted with naphtha, and in treating a volatile substance, loss by evaporation or volatilization or the spreading of injurious or dangerous fumes may be avoided in most cases by enclosing the substance during centrifugal treatment thereof and may in some cases be more effectively avoided by maintaining a pressure different from atmospheric pressure upon the substance being centrifugally treated. If it be desirable to promote evaporation of the substance being treated or of a constituent thereof a vacuum, or a pressure suitably lower than the pressure which would prevent evaporation under existing temperature conditions, may be maintained upon the substance being treated, the absolute pressure so employed depending upon the existing temperature and the physical properties of the substance because the occurrence and rate of evaporation depend upon both temperature and pressure. If the substance being treated contains dissolved gases, the escape thereof can be prevented by maintaining the substance under pressure during treatment, as in the clarification of beer or wine, or the removal thereof can be effected by maintaining the substance under a vacuum during treatment. Or a substance, or a constituent thereof, may be treated with a gaseous agent or a vapor while undergoing centrifugal treatment by maintaining in contact therewith such agent or vapor. A substance, or a constituent thereof, is in such a very finely divided state as it is discharged from the rotating member of the centrifugal machine that any result sought by the existence of pressure or vacuum is efficiently and readily attained.

A substance composed of one or more constituents may be subjected to the action of centrifugal force to effect various treatments thereof or changes therein. Thus, immiscible substances may be separated as in cases where a solid or semi-solid or other immiscible substances are separated by subsidence from a liquid, e. g. the separation of solids from beer or wine or the separation of wax or water from oil or the separation of water from emulsions or emulsions from oil. Or the centrifugal force may be employed for the purpose of producing an emulsion or causing interaction between substances, or it may be employed to effect many other changes of composition or state or condition. After being subjected to the action of centrifugal force for the purpose of effecting some desired change therein, the substance is dispersed in a finely divided state as it discharges from the centrifugal bowl under the action of centrifugal force. While in such dispersed state the substance is highly susceptible to the atmospheric conditions surrounding it so that by suitable regulation of those atmospheric conditions the condition of the substance may be controlled as by preventing undesirable changes in the substance or promoting or effecting desirable changes in the substance, a change or alteration in the substance that is additional to that effected by the action of centrifugal force being thereby promoted or prevented as desired. From the foregoing it will be apparent that regulation of the atmospheric conditions in which the substance exists in dispersed state may include adjustment of the pressure of the atmosphere, evaporation being caused by a pressure suitably lower than the pressure which would prevent evaporation under existing temperature conditions, and sub-atmospheric pressure preventing foaming and oxidation, higher pressure preventing escape of vapors or dissolved gases, and substantially tight enclosure preventing escape of volatile constituents. Whatever gas is maintained within the enclosure that surrounds the centrifuge and constitutes the atmosphere within which substances are discharged from the centrifugal bowl, may possess whatever pressure, temperature or degree of moisture is suitable to effect the desired result, such result including the promotion or prevention of absorption of that atmosphere. Inasmuch as apparatus embodying our invention permits of subjecting a substance to centrifugal treatment under any desired pressure, it is possible in the practice of our invention to feed a substance under pressure to a centrifuge and withdraw it from a centrifuge under pressure and by that same pressure deliver it at a level above the centrifuge.

The application for this patent is a division of our copending application Ser. No. 710,388, filed May 1st, 1924, that is directed to the control of the condition of a substance being centrifugally treated by regulation of the condition of the atmosphere within which the substance is so treated and within which it is centrifugally discharged in dispersed form, such condition including pressure, chemical properties and other properties of the atmosphere, said application specifically claiming that species of our invention wherein chemical properties of the atmosphere acting on the substance being centrifugally treated or on the substance discharged in dispersed form, are regulated to control the condition of that substance. Another division of said application, namely, application Ser. No. 183,534, filed April 13th, 1927, being directed to that species of our invention wherein sub-atmospheric pressure is utilized in controlling the condition of the substance being centrifugally treated or centrifugally discharged in dispersed form. Claims herein are directed to that species of our invention wherein the condition of substances being centrifugally discharged in dispersed form is controlled by the use of pressure other than atmospheric pressure and by the use of pressure above atmospheric pressure, a specifically claimed application of such control by pressure being the evaporation of a substance centrifugally discharged in dispersed state by utilizing a pressure, above or below atmospheric pressure, which is below a pressure that would prevent evaporation at the existing temperature. We also claim herein the details of our apparatus including the features that provide a closed centrifugal system and constitute a tight enclosure that prevents escape of vapors. The control of the condition of a substance centrifugally discharged in a dispersed state, by regulation of the conditions of the atmosphere acting on the dispersed substance is claimed in the application of the applicant, Leo D. Jones, Ser. No. 506,165, filed October 7th, 1921.

From the few instances that are above given, merely as examples, and of which many others will be apparent, it is clear that while a substance is under centrifugal treatment, changes or conditions thereof that are undesirable may be prevented and changes and conditions that are desirable may be effected or promoted by maintaining pressure or vacuum upon the substance, as may be desired.

Our invention has for its object the provision of a centrifugal machine possessing features and advantages that may be employed in centrifugal machines adapted for general purposes and also features and advantages whereby conditions or changes such, for example, as those above referred to may be maintained or effected or prevented or controlled as may be desired, a further object being the provision of a process involving the employment of a centrifugal machine and whereby changes in or conditions of substances being treated may be promoted, effected, prevented or controlled, as may be desired.

Other objects and advantages of our invention will be apparent from the following description of our process and of apparatus containing one embodiment of our invention and from the description of the mode of operation of such apparatus.

Figure 2:
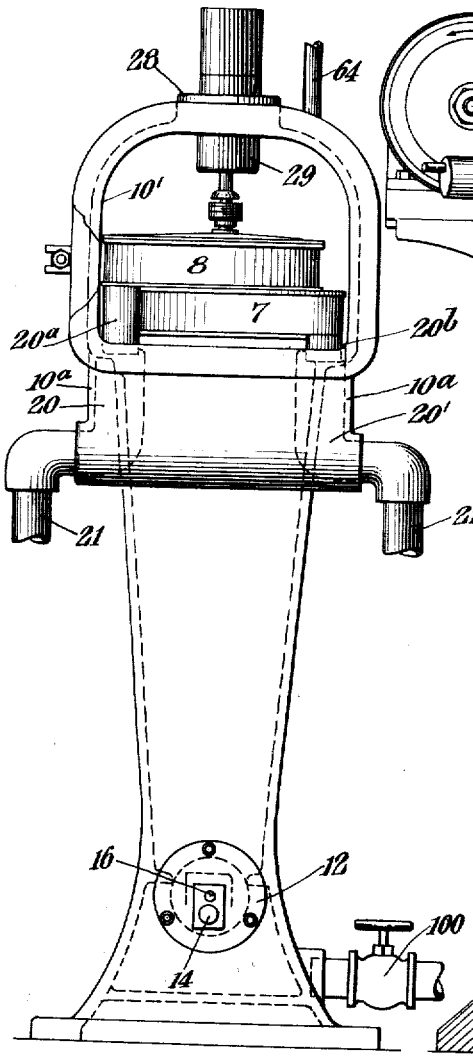
Fig. 2 is an elevation taken from the right side of the construction shown in Fig. 1.
Figure 1:
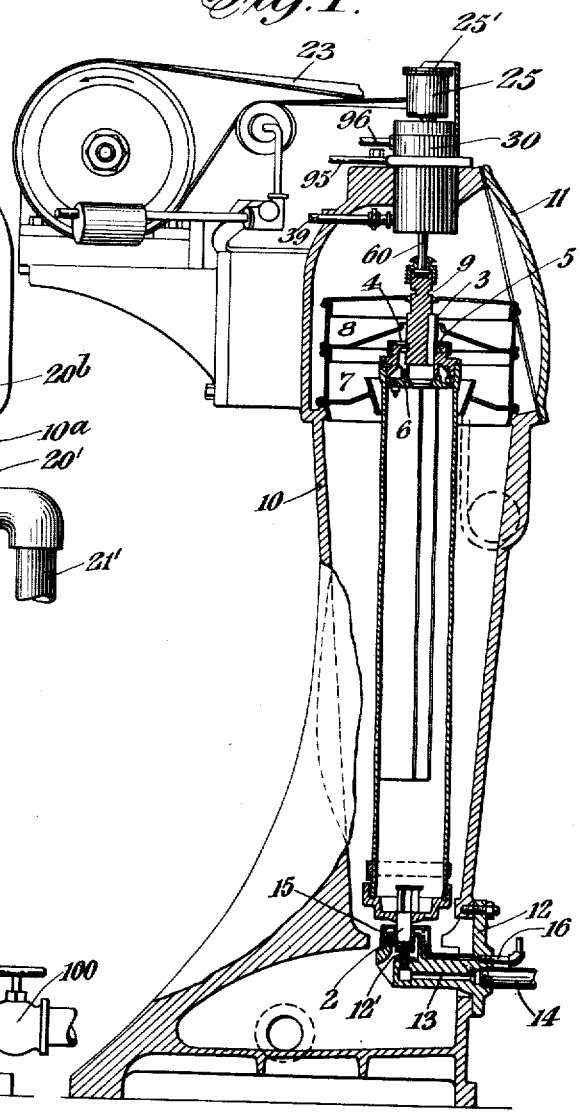
Fig. 1 is a vertical elevation, with parts in section, of a centrifugal machine embodying and suitable for the practice of our invention.
Figure 3:
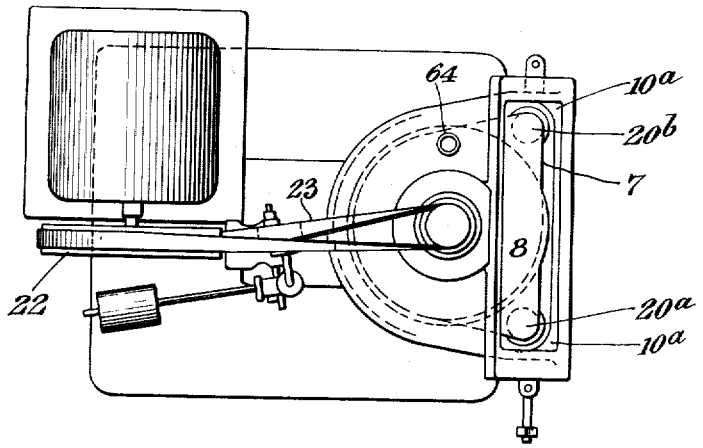
Fig. 3 is a top view of the construction shown in Fig. 1.

It being understood that the construction herein described is merely an example of apparatus that embodies our invention and whereby it may be practiced, it will be seen upon reference to Fig. 1 that the centrifugal bowl 1, which may be of any form and as shown is a bowl of the separator type, is provided with an inlet opening 2 which may be, as shown, at the bottom of the bowl and with outlets 3 and 4 which may be, as shown, at the upper end of the bowl. As is customary, each outlet is controlled by a weir in order that the proper hydrostatic balance may be maintained within the bowl. In the construction shown the circular dam 5 controls the outlet 4 and the circular dam 6 controls the outlet 3. Of course if mere clarification, wherein one constituent of a mixture is to be retained within the bowl, is to be carried out, discharge from one or the other outlet may be prevented by adjustment of its controlling dam. Whatever is discharged from the outlet 4 is collected in the compartment 7 and whatever is discharged from the outlet 3 is collected in the compartment 8. The bowl is supported through the stem 9 as hereinafter described.

Completely enclosing the separator bowl and its collecting compartments is a substantially closed casing 10 that is provided with a hand hole 10′ normally closed by the cover 11 in order that parts may be introduced into the casing and removed therefrom and adjustments made therein. Extending through the side of the casing and attached thereto is an inlet member 12, called the drag assembly, into the passage 13 of which leads the supply pipe 14. The nozzle 12′ of the inlet member directs the substance to be treated into the opening 2 of the bowl. The inlet member 12 carries centering means indicated at 15 that may be of any known construction and that cooperates with the lower end of the bowl to center the bowl as it rotates. A lubricant is introduced through the pipe 16 to the centering mechanism at 15.

Figure 4:
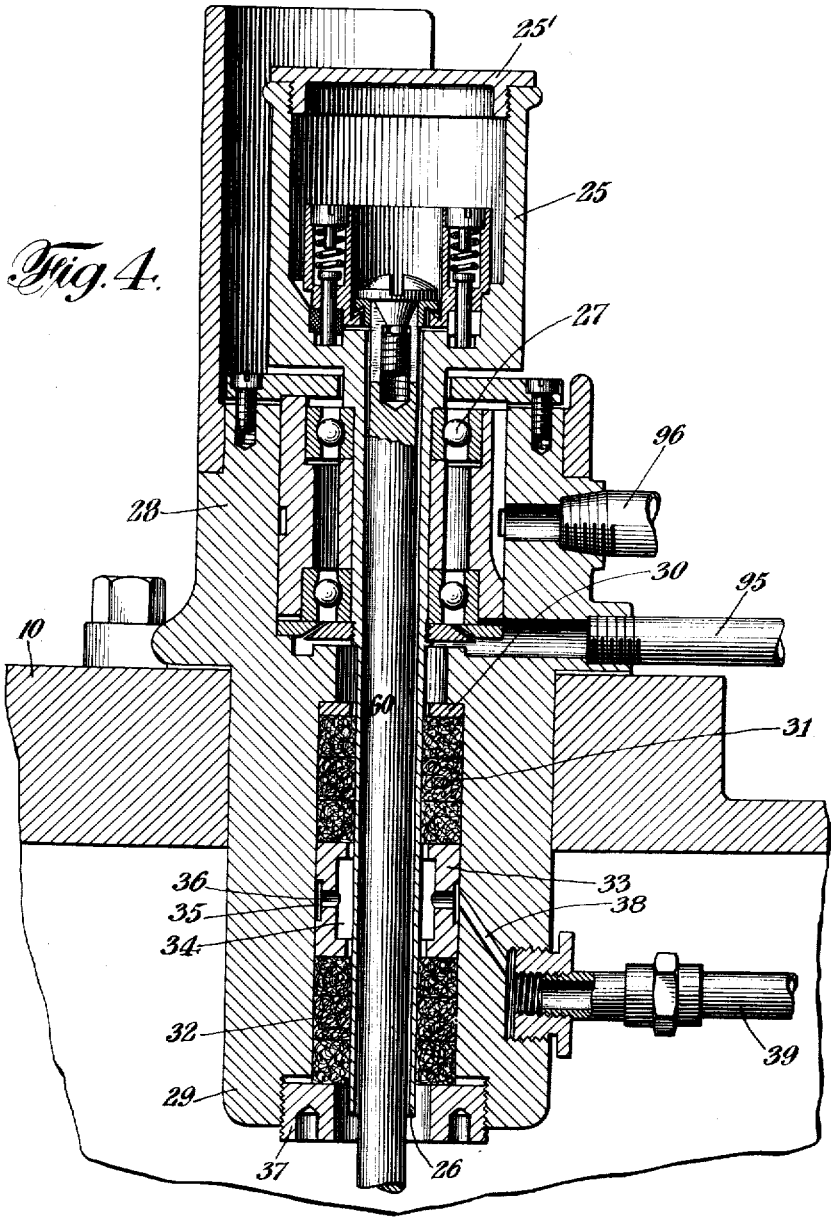
Fig. 4 is a sectional detail view.

The casing is formed with extensions $10^a$ respectively having passages 20 and 20′ to which are respectively connected discharge pipes 21 and 21′. The compartments for collecting substances discharged from the bowl have outlet spouts $20^a$ and $20^b$ respectively leading to the passages 20 and 20′. The atmosphere within the casing 10 will vary as to temperature, pressure, moisture, and chemical activity according to the nature of the substance or the effect that is sought to be made upon the substance undergoing treatment therein and for these reasons it is desirable to have the motor that drives the centrifuge located outside of the casing and such an arrangement is also desirable because the motor requires ventilation. Any spark produced in the motor would be dangerous if inflammable substances were being treated, and motor lubrication might contaminate substances passing through the centrifugal. And, in order to transmit power to the bowl, account must be taken of the desire to maintain various pressures within the casing and of the fact that the bowl and parts directly connected to it are subject to vibration by reason of the rotation of the bowl that may be in the neighborhood of 15,000 R. P. M. The motor driven pulley 22 has running over it the belt 23 tightened by the belt tightening idler 24. The belt passes around the pulley 25 that is provided with an extended hub or quill or hollow shaft 26. The power shaft 26 is supported by a bearing such as the ball bearing 27 that is carried by the bearing support 28 that is mounted in and forms a part of the casing 10. Between the hollow shaft 26 and the casing a seal is provided to prevent or control the escape of gas or air around the shaft 26. In the construction shown the bearing support 28 has a downward extension 29 and a seal is provided between the shaft 26 and the inner surface of the downward extension 29. This seal may be constructed in various ways. In Fig. 4 the space between the shaft 26 and the downward extension 29 provides a gland having at its inner end a washer 30 that supports an inner packing member 31. An outer packing member 32 is spaced from the inner packing member 31 by a ring 33 that is spaced from the shaft 26 to provide the chamber 34 and is provided with an outer groove 35 that communicates with the chamber 34 through the passages 36. The gland nut 37 compresses the packing members 31 to any desired degree. A passage 38 through the extension 29 communicates with the groove 35 and has connected to it the pipe 39 whereby the pressure in the chamber 34 may be regulated or the chamber may be supplied with fluid. If pressure is to be maintained within the casing 10 an equal or slightly greater pressure in the chamber 34 will prevent any leakage around the shaft 26; and a pressure in the chamber 34 that is only slightly less than the pressure within the casing 10 will so reduce the differential of pressures in the casing 10 and the chamber 34 that leakage around the shaft 26 will be prevented or negligible. In either case any leakage around the packing member 31 would be only leakage of whatever gas is supplied to the chamber 34 through the pipe 39. Liquid introduced into or under pressure within the chamber 34 will assist in effecting a seal around the shaft 26. Or a vacuum may be maintained in the chamber 34. It can be readily determined whether it is most desirable to have pressure or vacuum or a liquid in the chamber 34, but, in any event, leakage around the shaft 26 will be prevented or drawn off and loss or atmospheric pollution prevented.

Figure 6:
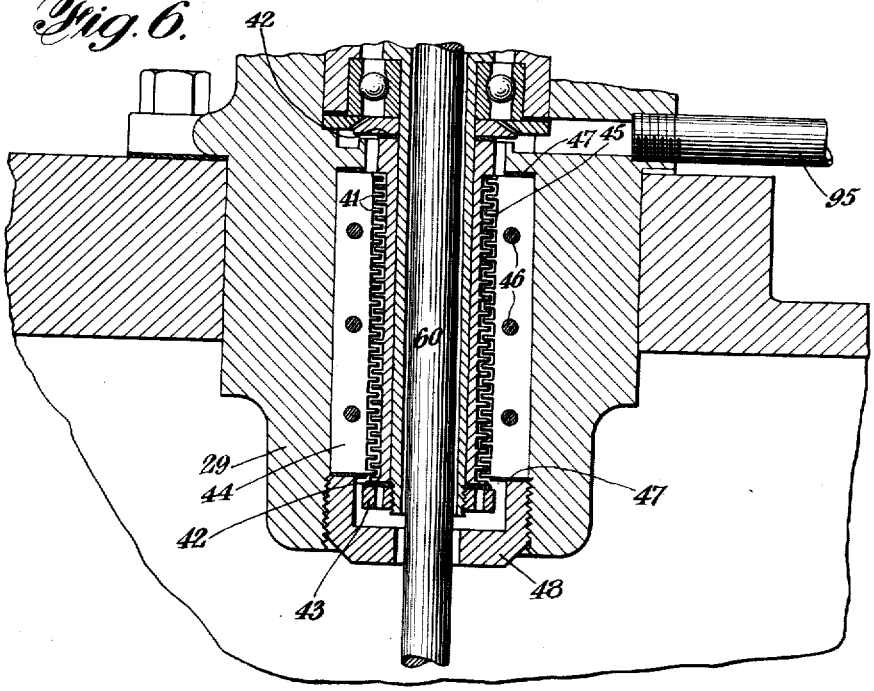
Fig. 6 is a sectional view of a modified form of seal for the power shaft.

In Fig. 6 a seal of the labyrinth type is shown for prevention of leakage between the shaft 26 and the casing 10. A cylindrical member 40 provided with many circumferential ridges 41 and having gaskets 42 at the upper and lower ends thereof is held on to the shaft 26 by a nut 43. Gas or liquid may be maintained between member 40 and a corresponding member 44 that has on its inner face circumferential ridges 45 that extend between the ridges 41, and is positioned within the downward extension 29 of the bearing support 28. The member 44 is made in two parts connected together by dowels or screws 46 or both in order that the members 40 and 44 may be assembled. The circuitous or labyrinth path between the outer surface of the member 40 and the inner surface of the member 44 will retard or prevent leakage between the shaft 26 and the casing 10. The outer member 44 has gaskets 47 at its upper and lower ends and is held in place by the nut 48.

Figure 7:
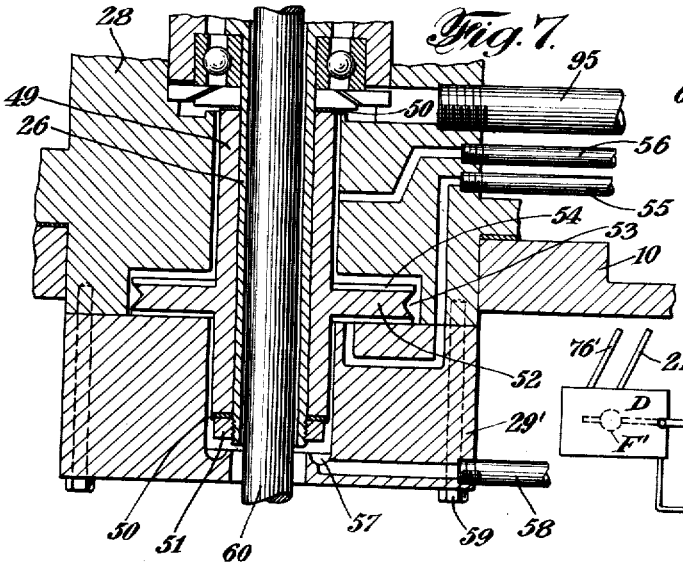
Fig. 7 is a sectional view of another modification of the seal.
Figure 8:
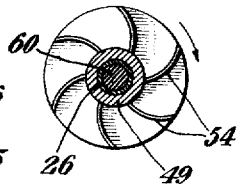
Fig. 8 is a sectional view of line 8—8 of Fig. 7.

The seal between the shaft 26 and the casing 10 may be in the form of a liquid seal and in Fig. 7 we have shown one embodiment of such a construction. The sleeve 49 is held between gaskets 50 on the shaft 26 by means of a nut 51. Carried upon the sleeve 49 is a disk 52 that is positioned within the annular chamber 53 of the downward extension 29′ of the bearing support 28. Liquid is maintained in the chamber 53 as more fully hereinafter described and the disk 52 carries impeller vanes, for example, the curved vanes 54 that are so formed and positioned upon the disk that they impel fluid within the chamber 53 in a direction opposite to the direction in which the pressure would normally tend to move the fluid in chamber 53. Thus assuming that there is a pressure in the casing 10, fluid will be supplied through the inlet 55 and be conducted to the chamber 53 below the disk 52 and be thrown outward in the chamber 53 by reason of the rotation of the disk 52 so that gas passing upward between the sleeve 49 and the inner face of the downward extension 29′ will be prevented from escaping from the casing 10. In order to assist in maintaining a sufficiently large body of liquid in the chamber 53 and in contact with the rotating disk 52, the vanes 54 are placed on the upper side of the disk 52 and as they tend to throw the liquid outward they tend to move the liquid in the direction opposite to the direction in which a pressure within the casing is tending to move it. Any excess liquid may be discharged through the pipe 56, or the pipe 95 that carries away oil that is fed to the bearings through the pipe 96. If there is a vacuum within the casing, flow would ordinarily be downward between the sleeve 49 and the inner face of the extension 29′ so the impeller vanes 54 would be located on the under side of the disk 52 and fluid would be introduced through the pipe 56 and any excess liquid would collect in the annular channel 57 and be conducted to some desired point within or outside of the casing by means of the pipe 58. The parts of the extension 29′ are held together by bolts 59.

The head of the bowl 1 is, as is usual, provided with a stem 9 that is connected with a spindle 60 in a well known manner, as by the nut 9ª threaded onto stem 9, and the upper end of the spindle is connected to the driving pulley or other prime mover 25. The particular construction of the bearing by which the shaft 26 is supported and the connection between the spindle 60 and the pulley 25 form no part of our present invention and they are more particularly described in the application of Arthur U. Ayres filed April 6, 1925, Serial No. 20,961. But it is to be noted that while the centrifugal bowl is entirely enclosed, power from a source outside of the enclosure is transmitted to the bowl through mechanism, a part of which, e. g. shaft 26, is firmly supported from the bearing while another part, e. g. the spindle 60 is free to partake of such vibration, and flexure as may result from the rapid rotation of the bowl. The seal that prevents leakage where the transmitting mechanism passes through the casing is located between the casing and a part of the power transmitting mechanism, e. g. shaft 26, that is relatively free of vibration. The upper end of the pulley is closed by a cap 25′. And it is also to be noted that after removing cover 11 and releasing coupling nut 9ª compartments or covers 7 and 8 may be withdrawn from the hand hole 10′; and in order to facilitate the removal of the bowl 1 from casing 10, the casing may be hollowed out as indicated at 10ª.

It will thus be apparent that while by placing the motor outside of the casing we have avoided the many difficulties that would arise if the motor were placed within the casing, we have nevertheless provided a seal for the transmitting mechanism that extends into the casing and we have avoided the difficulties that would arise if it were attempted to seal a part of the transmitting mechanism that partakes of the vibrations and flexure due to the rapid rotation of the bowl. The valved pipe 100 is provided for draining the casing 10.

Figure 5:
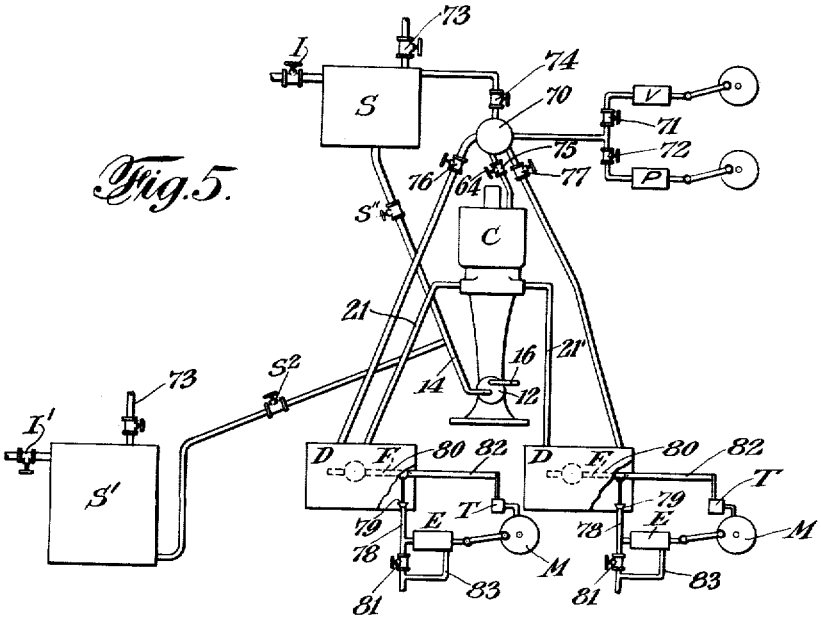
Fig. 5 is a diagrammatic view showing the manner of feeding and withdrawing material from the construction shown in Fig. 1.

In Fig. 5 we have shown diagrammatically certain connections and devices whereby the feeding and discharging of substances to and from the casing may be effected while the pressure or vacuum therein is maintained or controlled as desired. A chamber or header 70 is connected to a vacuum pump V or a pressure pump P. When the valve 71 is opened and the valve 72 closed a vacuum will be created in the chamber 70 and when the valve 72 is opened and the valve 71 is closed pressure will be created in the chamber 70. A supply tank S having an inlet controlled by the valve I and a vent controlled by the valve 73 is connected to the chamber 70 by a pipe controlled by the valve 74. The pipe 64 leading from the casing to the chamber 70 is controlled by the valve 75. The discharge pipes 21 and 21′ lead from the casing to discharge tanks D, D. Vent pipes leading from the discharge tanks to the chamber 70 are controlled by the valves 76 and 77. Each discharge tank D has an outlet 78 that may lead to any desired point. Flow from each tank D through its outlet 78 is controlled as by a valve 79, the opening and closing of which is dependent upon the level of liquid in the tank D. For example, valve 79 may be controlled by a float F operating the lever 80. An alternate method of emptying a tank D, that is used particularly when there is a vacuum within the tank D, consists in closing the valve 81 and permitting an extension 82 of the float operated lever 80 to actuate a controlling device T of a prime mover M that in turn actuates an exhausting pump E. The pipe 39 leading to the space between the packing members 31 and 32 may be connected in any manner to the vacuum pump V or the pressure pump P or to a source of liquid supply as may be desired. The pipe 16 conducting lubricant to the guiding mechanism 15 may be supplied and controlled in any known manner.

If the centrifugal treatment is to be carried out with pressure, above that of the atmosphere, in the casing C the supply tank is closed by the closing of the valves I and 73 and pressure is created in the chamber 70. The valve 75 is opened to permit pressure to accumulate in the casing C and in the discharge tanks D and the valves 74, 76 and 77 are opened in order to equalize the pressures in the tanks S and D and the casing C. The supply to the centrifugal machine is controlled by the valve S″ and constituents of the substance treated pass through the discharge pipes 21 and 21′ into the discharge tanks until the level therein is sufficiently high to raise the valve 79 and permit flow through the outlets 78, the valves 81 of which are open. If the centrifugal treatment is to be carried out with a vacuum existing in the casing C the valves 81 of the outlets 78 are closed and a vacuum is created in the chamber 70 by means of the pump V. As the level rises in the discharge tanks D the floats F will raise the valves 79 and actuate the control devices T in such a way as to cause the pumps E to withdraw liquid from the tanks D and discharge it through the pipes 83 into the outlet 78. Under certain conditions it may be desirable to have atmospheric pressure in the tank S when there is a vacuum in the casing C and then the valve 74 is closed and the valve 73 opened. If the centrifugal treatment is to be carried out under atmospheric pressure but still while the casing C is closed off from the surrounding atmosphere there will be neither pressure nor vacuum in the chamber 70 but the various vent pipes will permit of the desired flow. The supply may be from a point below the level of the casing C such as the tank S′ that has an inlet valve I′ and a valve 73′ corresponding to the valves I and 73 of the tank S. Flow from tank S′ to the casing is controlled by the valve $S^2$. If it is desired to carry out the centrifugal treatment in the presence of any particular gas such a gas may be supplied by pump P at either atmospheric pressure or some greater pressure or after the system is filled with such a gas the pressure thereof may be reduced.

It will be apparent that because of the very high speeds encountered in connection with centrifugal treatment of substances and the proportionately great pressures and forces incident thereto that certain conditions that arise by reason of forces, speeds, or possible agitation may either be utilized in effecting a desired change or may interfere with the attainment of the desired result and that it is therefore desirable to control such conditions, for example, the tendency of a substance to foam. And when a substance or constituent of a substance is discharged at very high speed from the rotating bowl it is discharged in such an extremely finely divided form that outside influences act upon the substance very readily. For example, the presence of air may oxidize a substance, e. g. whale oil, or transformer oils, or sour oils, or the presence of another gas may readily effect a desired change and in accordance with our invention we intend that the finely divided state of the discharged substance or constituent may be taken advantage of in effecting a treatment of that substance or constituent by a gas or in order to effect evaporation, such evaporation being preferably effected by maintaining a suitable pressure, in view of the existing temperature, in the space where the substance exists in finely divided form as an incident of its discharge from the centrifugal machine.

The fact that the casing C is closed except for controlled openings therein makes it possible to carry out centrifugal treatment without any chance that vapors or gases will be lost or will pollute the surrounding atmosphere. And such closed condition of the casing makes it possible to carry out the centrifugal treatment under pressure or vacuum in accordance with the principles and for the attainment of the results above described.

While we have described certain arrangements for controlling the pressure within the casing C under certain conditions of feeding and discharging, such control being effected by the maintenance of pressure or vacuum or atmospheric pressure in the supply tanks and discharge tanks, it will be apparent that other arrangements of vents and other setting of valves are possible so that there is such equalization of pressures within the various tanks and the casing as will permit of the desired flow of the substance being treated.

Figure 9:
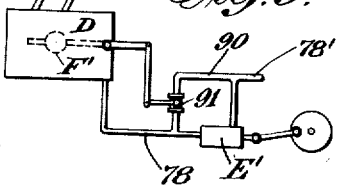
Fig. 9 shows a modification of means for evacuating a discharge tank.

From the foregoing it will be apparent that we have disclosed apparatus and a process whereby the various alterations and conditions above set out, and others that will be apparent, of the substance being treated or the constituents thereof, may be effected or prevented or controlled as desired. And while we have described such apparatus and process in considerable detail, we do not intend to be limited to such details but we intend that our invention shall be susceptible of such variations and modifications as fall within the hereunto appended claims. It will also be apparent that we have provided a process and apparatus whereby the condition of a substance being centrifugally treated is maintained constant or preserved or altered, e. g. foaming, oxidation and loss of dissolved gases are prevented and evaporation or chemical change is furthered or prevented, by controlling or regulating the pressure of the atmosphere within which the centrifugal treatment takes place and by controlling or regulating the circulation of the atmosphere within which centrifugal treatment takes place as by enclosing the centrifugal machine so that vapors or gases do not escape or may build up a pressure. While we have shown several types of devices for sealing the power transmitting mechanism where it passes into the casing, such devices are described for the purpose of illustrating the principles of our invention whereby such seals may be formed and made effective but we do not intend to be limited to the construction shown. A possible modification of means for evacuating the discharge tank D is shown in Fig. 9 wherein the tank D is supplied with fluid through the pipe 21 and is vented by the pipe 76′ and fluid is withdrawn from the tank by the pump E′. Fluid will be withdrawn from the tank D through the pipe 78 and leaves the pump E′ through pipe 78′, but in order to prevent the pump from drawing air when the tank D is empty a by-pass 90 extends around the pump E′ from pipe 78 to pipe 78′ and the float F′ opens the valve 91 in the by-pass 90 when the liquid level in tank D drops so that liquid will pass from the pipe 78′ back to the pipe 78 and prevent the pump from entirely emptying the tank D regardless of whether fluid is flowing into the tank D or not.

What we claim as new and desire to secure by Letters Patent of the United States is:

1. In the centrifugal treatment of a substance the process which comprises subjecting the substance to the action of centrifugal force to effect a desired change in the substance and to discharge the substance in dispersed form from the influence of the centrifugal force, and suitably regulating the pressure of the atmosphere within which the substance is so discharged to prevent undesirable alteration of the substance while it exists in the dispersed state in which it is discharged.

2. In the centrifugal treatment of substances, the process which comprises centrifugally subsiding and centrifugally discharging the substance and suitably regulating the pressure of the atmosphere within which the substance is discharged to control the condition of the substance during and after discharge thereof.

3. In the centrifugal treatment of substances the process which comprises effecting a desired change in a substance by subjecting it to the action of centrifugal force and centrifugally discharging the changed substance from the influence of centrifugal force, and suitably regulating the pressure of the atmosphere within which the substance is so discharged to control the condition of the substance during discharge thereof.

4. In the centrifugal treatment of a substance the process which comprises subjecting the substance to the action of centrifugal force to effect a desired change in the substance and to discharge the substance in dispersed form from the influence of the centrigual force, and effecting a second desired change in the substance by suitably regulating the pressure of the atmosphere within which the substance is so discharged.

5. In the centrifugal treatment of substances the process which comprises subjecting a substance to the action of centrifugal force and thereby effecting a desired change in the substance and discharging the changed substance in dispersed state, and maintaining gas pressure other than atmospheric pressure upon the substance while it exists in the dispersed state in which it is centrifugally discharged.

6. In the centrifugal treatment of substances the process which comprises subjecting a substance to the action of centrifugal force and thereby effecting a desired change in the substance and discharging the changed substance in dispersed state, and effecting evaporation of the substance by regulating the pressure thereon while in such dispersed state.

7. In the centrifugal treatment of substances the process which comprises subjecting a substance to the action of centrifugal force and thereby effecting a desired change in the substance and discharging the changed substance in dispersed state, and maintaining gas pressure above atmospheric pressure upon the substance while it exists in the dispersed state in which it is centrifugally discharged.

8. In the centrifugal treatment of substances the process which comprises subjecting a substance to the action of centrifugal force and thereby effecting a desired change in the substance and discharging the changed substance in dispersed state, and suitably regulating the pressure of the atmosphere within which the substance is subjected to centrifugal treatment and so discharged to control the condition of the substance while being subjected to centrifugal force and while it exists in the dispersed state in which it is centrifugally discharged.

9. In the centrifugal treatment of substances the process which comprises subjecting a substance to the action of centrifugal force and thereby effecting a desired change in the substance and discharging the changed substance in dispersed state, and maintaining gas pressure other than atmospheric pressure upon the substance while it is subject to centrifugal force and while it exists in the dispersed state in which it is centrifugally discharged.

10. In combination, a centrifugal machine of the type wherein a substance is subjected to the action of centrifugal force to effect a change therein and centrifugally discharged in a dispersed state, an enclosure for said machine, supply and discharge tanks, conducting means for delivering a substance from said supply to said machine and from said machine to said discharge tank, and means for controlling the pressure in said tanks and said enclosure.

11. In combination, a centrifugal machine of the type wherein a substance is subjected to the action of centrifugal force to effect a change therein and centrifugally discharged in a dispersed state, and means for regulating the pressure of the atmosphere within which the substance is subjected to the action of centrifugal force to effect a change therein and within which the substance is centrifugally discharged in a dispersed state.

12. In combination, a centrifugal machine of the type wherein a substance is subjected to the action of centrifugal force to effect a change therein and centrifugally discharged in a dispersed state, and means for regulating the gas pressure acting upon the substance while it exists in the dispersed state in which it is discharged.

13. In a centrifugal machine, a separator bowl for separating and separately discharging substances under the action of centrifugal force in a dispersed state, compartments for respectively collecting such separately discharged substances, means substantially enclosing said bowl and compartments and including a casing having supply and discharge conduits tightly connected thereto, means for conducting a substance from said supply conduit to said bowl, and means for conducting separated constituents from said compartments to said discharge conduits.

14. In combination a centrifugal bowl of the type whereby a substance is subjected to the action of centrifugal force to effect a change therein and discharged in dispersed form, a casing enclosing said bowl and having inlet and discharge openings, supply and discharge conduits tightly connected to said casing at said openings, and a compartment removably mounted in said casing and receiving a substance discharged from said bowl and having an outlet discharging into a discharge opening of said casing.

15. In combination a centrifugal bowl having inlet and discharge openings and adapted for centrifugally treating substances and discharging them in dispersed form, a support on which said bowl is mounted for rotation and having a discharge passage, a discharge conduit tightly connected to said support at said passage, and a compartment supported by said support to receive a substance discharging from said discharge opening and having an outlet discharging into said discharge passage.

16. In a centrifugal machine, a separator bowl for separating and separately discharging substances under the action of centrifugal force in a dispersed state, means substantially enclosing said bowl, means for conducting a substance to said bowl from a point outside of said enclosing means, means for conducting the separated substances out of said enclosing means, and means for controlling the gaseous pressure within said enclosing means.

17. In a centrifugal machine, a bowl, a substantially closed casing wherein said bowl is enclosed for rotation, rotation transmitting means extending from said bowl to a point outside of said casing and including a part substantially free of the vibration of said bowl, and packing between said part and said casing.

18. In a centrifugal machine, a bowl, a substantially closed casing wherein said bowl is enclosed for rotation, rotation transmitting means extending from said bowl to a point outside of said casing and including flexibly connected parts, and a seal between one of said parts and said casing.

19. In a centrifugal machine, a bowl, a substantially closed casing wherein said bowl is enclosed for rotation, rotation transmitting means extending from said bowl to a point outside of said casing and including flexibly connected parts, a bearing in said casing and supporting one of said parts, and a seal between said part so supported and said casing.

20. In a centrifugal machine, a bowl, a substantially closed casing wherein said bowl is enclosed for rotation, a sealed shaft extending into said casing, and a spindle jointed to said shaft and connected to said bowl.

21. In a centrifugal machine, a bowl, a substantially closed casing wherein said bowl is enclosed for rotation, a sealed hollow shaft extending into said casing, a spindle within said shaft and universally connected thereto at a point near the outer end of said shaft and to said bowl.

22. In combination, a centrifugal machine including a bowl, supply and discharge tanks for said machine, an enclosure for said bowl, fluid passages between said tanks and bowl, and means for equalizing the pressure in said tanks and said enclosure.

23. In combination, a centrifugal machine including a bowl, supply and discharge tanks for said machine, an enclosure for said bowl, fluid passages between said tanks and said bowl, and means for emptying said discharge tank.

24. In combination, a centrifugal machine including a bowl, supply and discharge tanks for said machine, an enclosure for said bowl, fluid passages between said tanks and said bowl, and means for equalizing pressure in said enclosure and said discharge tank.

25. In combination, a centrifugal machine having a bowl wherein a substance is subjected to the action of centrifugal force to effect a change therein and centrifugally discharged, an enclosure for the bowl, a conduit leading into said enclosure for conducting a substance to said bowl, a conduit leading out of said enclosure for withdrawing a substance discharged from said bowl, and means for regulating the pressure in said conduits.

26. In combination, a centrifugal machine having a bowl wherein a substance is subjected to the action of centrifugal force to effect a change therein and centrifugally discharged, an enclosure for the bowl, a conduit leading into said enclosure and tightly connected thereto for conducting a substance to said bowl, and a conduit leading out of said enclosure and tightly connected thereto for withdrawing a substance discharged from said bowl, whereby a substance passed through said machine may be withdrawn at the pressure at which it is introduced.

27. In combination, a centrifugal machine including a bowl, supply and discharge tanks for said machine, an enclosure for said bowl, fluid passages between said tanks and said bowl, and means for regulating the pressure in each of said tanks.

28. In combination, a centrifugal machine including a bowl of the type whereby a substance is subjected to the action of centrifugal force to effect a change therein and discharged in dispersed form, supply and discharge tanks for said machines, an enclosure for said bowl, fluid conduits between said tanks and said bowl and connected to said tanks and enclosure to provide a closed system from said supply tank to said discharge tank and including said centrifugal machine.

29. In combination, a centrifugal machine of the type wherein a substance is subjected to the action of centrifugal force to effect a change therein and centrifugally discharged in a dispersed state, and means for effecting evaporation of the substance as it exists in the dispersed state in which it is discharged.

30. In combination, a centrifugal machine of the type wherein a substance is subjected to the action of centrifugal force to effect a change therein and centrifugally discharged in a dispersed state, and means whereby a substance is introduced to said machine and subjected to centrifugal force therein to effect a change in the substance and withdrawn from said machine while the substance is under predetermined pressure.

31. In combination, a centrifugal machine of the type wherein a substance is subjected to the action of centrifugal force to effect a change therein and centrifugally discharged in a dispersed state, and means whereby a substance so discharged may be maintained at, and withdrawn from said machine under a pressure other than atmospheric pressure.

32. In combination, a centrifugal machine of the type wherein a substance is subjected to the action of centrifugal force to effect a change therein and centrifugally discharged in a dispersed state, compartments for collecting a substance so discharged, and means for regulating the gaseous pressure within said compartments.

33. In combination, a centrifugal machine including a bowl, supply and discharge tanks for said machine, an enclosure for said bowl, fluid passages between said tanks and said enclosure, and venting passages between said tanks and said enclosure.

34. In combination, a centrifugal machine including a bowl, supply and discharge tanks for said machine, an enclosure for said bowl, fluid passages between said tanks and said enclosure, and means for emptying said discharge tank and operative only when said discharge tank contains fluid.

35. In combination, a centrifugal machine including a bowl, a discharge tank therefor, a means for emptying said discharge tank, and a by-pass around said means and controlled by the liquid level in said discharge tank.

36. In combination, a centrifugal machine including a bowl, a discharge tank therefor, and means for emptying said tank and controlled by the liquid level in said tank.

37. In combination, a centrifugal bowl of the type whereby a substance is subjected to the action of centrifugal force to effect a change therein and discharged in dispersed form, a support for said bowl and having a discharge passage therein, and a compartment carried by said support and receiving a substance discharging from said bowl and having an outlet in operative relation to said passage in said support.

38. In combination a casing closed except for inlet and discharge passages, conduits tightly connected to said casing at said passages, a centrifugal bowl having an inlet and a discharge, means for supporting said bowl in said casing with its inlet in operative relation to said inlet passage, and a compartment removably supported in said casing and receiving a substance discharged from said bowl and having an outlet discharging into said outlet opening.

39. In combination a casing having a covered opening, a shaft opening and supply and discharge openings, a shaft sealed and supported for rotation in said shaft opening, a centrifugal bowl having an inlet and a discharge, a compartment removably supported in said casing and receiving a substance discharging from said bowl and having an outlet discharging into said discharge opening of said casing, and a releasable coupling supporting said bowl from said shaft with said inlet and discharge of said bowl respectively in operative relation to said supply opening and said compartment.

40. In combination a centrifugal bowl of the type whereby a substance is subjected to the action of centrifugal force to effect a change therein and discharged in dispersed form, a casing enclosing said bowl and having inlet and discharge openings, supply and discharge conduits tightly connected to said casing at said openings, and means for directing into a discharge opening of said casing a substance discharged from said bowl.

41. In combination a centrifugal bowl of the type whereby a substance is subjected to the action of centrifugal force to effect a change therein and discharged in dispersed form, an enclosing casing having controlled gas and liquid openings, a compartment receiving a substance discharged from said bowl and discharging said substance through one of said openings, means conducting liquid from one of said openings to said bowl, and a gas pump connected to one of said openings.

42. In combination a centrifugal bowl of the type whereby a substance is subjected to the action of centrifugal force to effect a change therein and discharged in dispersed form, a casing enclosing said bowl and having inlet and discharge openings, supply and discharge conduits tightly connected to said casing at said openings, and a removable compartment receiving a substance discharged from the bowl and having an outlet and closely fitting and substantially closing said casing with said outlet in discharge relation to said discharge opening.

43. In combination a centrifugal bowl of the type whereby a substance is subjected to the action of centrifugal force to effect a change therein and discharged in dispersed form, a casing enclosing said bowl and having inlet and discharge openings, supply and discharge conduits tightly connected to said casing at said openings, and a removable compartment receiving a substance discharged from the bowl and provided with an outlet having an operative connection with said discharge opening independent of the connection of said discharge conduit thereto.

44. In combination a centrifugal bowl of the type whereby a substance is subjected to the action of centrifugal force to effect a change therein and discharged in dispersed form, an enclosing casing for said bowl and provided with a bearing, a high-speed driving shaft sealed in said casing and supported in said bearing, means for connecting said bowl and shaft for simultaneous rotation, and a source of power and speed change gearing exterior of said casing.

45. In a centrifugal machine, a casing having a driving shaft opening in its upper end and supply and discharge openings and a covered opening, a shaft supported in said shaft opening, a seal sealing said shaft in said casing, a centrifugal bowl removably suspended in said casing from said shaft, and a compartment removably supported by said casing and encircling said bowl and receiving a substance discharged from said bowl and having an outlet discharging into said discharge opening.

46. In the centrifugal treatment of substances the process which comprises subjecting a substance to the action of centrifugal force and thereby effecting a desired change in the substance and discharging the changed substance in dispersed state, and preventing the escape of vapors or gases from the substance by maintaining the substance tightly enclosed during centrifugal treatment thereof and while it exists in the finely divided state in which it is centrifugally discharged.

47. In combination, a centrifugal machine of the type wherein a substance is subjected to the action of centrifugal force to effect a change therein and centrifugally discharged in a dispersed state, and means including an enclosing casing whereby escape of gases and vapors from the substance being subjected to centrifugal force and so discharged may be prevented.

Signed at Philadelphia, in the county of Philadelphia, and State of Pennsylvania, this 11th day of April, 1927.

LEO D. JONES.
ARTHUR U. AYRES.

DISCLAIMER

Re. No. 16,640.—*Leo D. Jones* and *Arthur U. Ayres*, Philadelphia, Pa. CENTRIFUGAL MACHINE AND PROCESS INVOLVING THE USE OF THE SAME. Patent dated May 31, 1927. Disclaimer filed January 30, 1931, by the assignee, *The Sharples Specialty Company*.

Hereby enters the following disclaimer:

Your petitioners disclaim from the scope and meaning of claim 40, constructions in which movement of the means for directing into a discharge opening of the casing a substance discharged from the bowl, from the operative position occupied by said means when it is directing into a discharge opening of the casing a substance discharged from the bowl, requires movement of that part of the outer wall of the casing which contains a discharge opening at which a discharge conduit is tightly connected to the casing, from the operative position occupied by said part of the outer wall of the casing when a substance discharged from the bowl is being directed by said means into the discharge opening therein.

[*Official Gazette February 17, 1931.*]